W. H. VAN GIESON.
FISHING LINE REEL.
No. 43,460. Patented July 5, 1864.
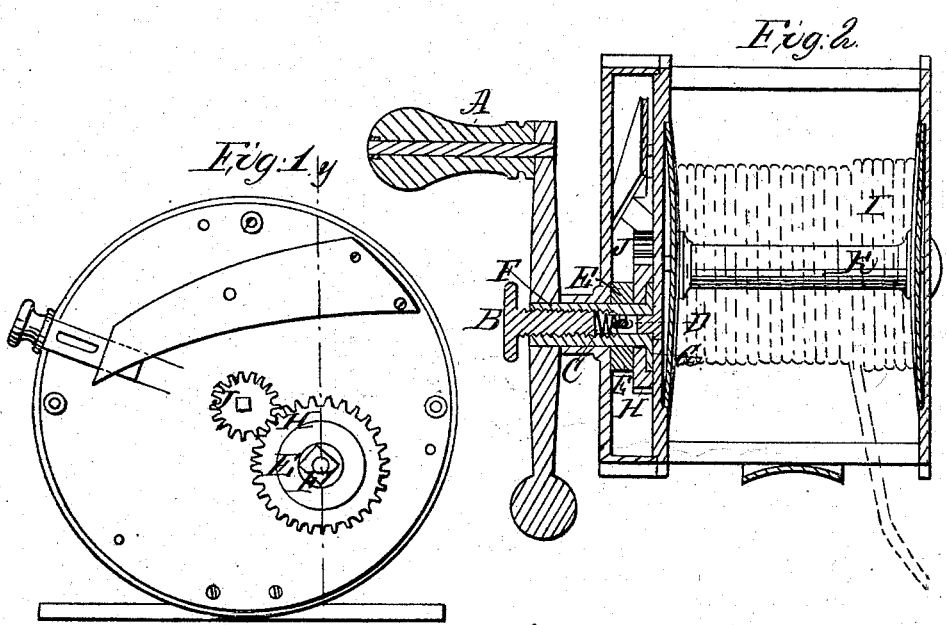
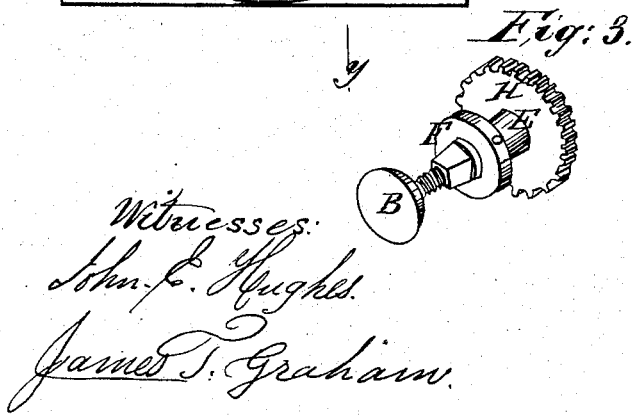

UNITED STATES PATENT OFFICE.

WM. H. VAN GIESON, OF NEW YORK, ASSIGNOR TO THOS. H. BATE, OF HIGHLAND, AND WM. MILLS, OF NEW YORK, N. Y.

IMPROVEMENT IN FISHING-LINE REELS.

Specification forming part of Letters Patent No. 43,460, dated July 5, 1864.

*To all whom it may concern:*

Be it known that I, WILLIAM H. VAN GIESON, of the city, county, and State of New York, have invented certain Improvements in Fish-Reels, of which the following is a specification.

My invention consists in clamping the cog-wheel that works the shaft about which the line is wound between the wheels which revolve with the crank, and thus revolve the cog-wheel and shaft by friction, in order to avoid the danger of breaking the apparatus and losing the line and fish by any sudden jerk or strain which the fish may give to the line.

In the drawings, Figure 1 is a side view of the reel with the crank and cap removed. Fig. 2 is a section of the reel through the line *y y*. Fig. 3 is a view of friction-collar and cog-wheel.

A is the crank by means of which the line is wound or reeled in. B is a thumb-screw, by means of which the pressure upon the coiled spring C is regulated.

C is a coiled spring, held down and the pressure it exerts regulated by the thumb-screw B. The other end of the coiled spring C rests upon a pin, D, which passes through a hole in the friction wheel or collar E and through a slot in the crank-shaft or stud F.

G is a wheel firmly attached to and forming a part of the crank-shaft F, which fits into and works in a recess in the cog-wheel H.

By turning down the thumb-screw B the coiled spring C forces the pin D along the slot in the crank-shaft F, and thus forces the friction-wheel E against one side of the cog-wheel H. At the same time the wheel G is drawn up against the other side of the cog-wheel H, which said cog-wheel H is thus clamped between the wheels E and G, and is carried round by and with the crank-shaft F. The cog-wheel H works into and revolves the cog-wheel J, attached to the shaft K, about which the line is wound or reeled.

The object and advantage of my invention is that it preserves the apparatus from the danger of being broken and prevents the consequent loss of fish and line by any sudden jerk or strain caused by the fish running or turning suddenly, for the force necessary to break the line or apparatus is always less than that required to overcome the friction of the wheels E and G upon the cog-wheel H, so that the only effect of such jerk or strain will be to run out the line. Another advantage is that the operator may continue constantly reeling in his line from the time the fish is hooked, for when the fish pulls hard enough to overcome the friction the line will run out, and when the fish slacks up, or turns, or runs back, or pulls less than enough to overcome the friction, the wheels E and G will immediately act upon the cog-wheel H and reel in the line.

I claim—

The combination of the thumb-screw B, the coiled spring C, the pin D, and the friction-wheels E and G with the cog-wheel H and the crank-shaft F, substantially as and for the purpose set forth.

W. H. VAN GIESON.

Witnesses:
    THOS. P. HOW,
    JAMES T. GRAHAM.